United States Patent
Weist, Jr. et al.

(10) Patent No.: US 10,576,455 B2
(45) Date of Patent: Mar. 3, 2020

(54) PARTICLE LOADING METHOD AND APPARATUS FOR A RADIAL FLOW VESSEL

(71) Applicant: Air Products and Chemicals, Inc., Allentown, PA (US)

(72) Inventors: Edward Landis Weist, Jr., Macungie, PA (US); Stephen John Gibbon, England (GB); Nasim Ul Hassan Malik, London (GB); Clive Chalk, Wrexham (GB); Stephen Clyde Tentarelli, Schnecksville, PA (US)

(73) Assignee: Air Products and Chemicals, Inc., Allentown, PA (US)

(*) Notice: Subject to any disclaimer, the term of this patent is extended or adjusted under 35 U.S.C. 154(b) by 219 days.

(21) Appl. No.: 15/928,213

(22) Filed: Mar. 22, 2018

(65) Prior Publication Data

US 2019/0291078 A1 Sep. 26, 2019

(51) Int. Cl.
*B01J 4/00* (2006.01)
*B01J 20/28* (2006.01)
(Continued)

(52) U.S. Cl.
CPC ...... *B01J 20/28052* (2013.01); *B01D 15/206* (2013.01); *B01D 53/0423* (2013.01); *B01D 53/0431* (2013.01); *B01J 20/3092* (2013.01); *B01D 53/047* (2013.01); *B01D 53/0462* (2013.01); *B01D 53/0476* (2013.01); *B01D 2253/104* (2013.01); *B01D 2253/106* (2013.01); *B01D 2253/108* (2013.01); *B01D 2256/10* (2013.01); *B01D 2256/12* (2013.01); *B01D 2257/504* (2013.01); *B01D 2257/80* (2013.01); *B01D 2259/4146* (2013.01)

(58) Field of Classification Search
CPC ............ B01J 20/28052; B01J 20/3092; B01D 15/206; B01D 53/0423; B01D 53/0431; B01D 53/047; B01D 53/0462; B01D 53/0476; B01D 2256/10; B01D 2256/12; B01D 2257/80; B01D 2257/504; B01D 2253/108; B01D 2253/106; B01D 2253/104; B01D 2259/4146
See application file for complete search history.

(56) References Cited

U.S. PATENT DOCUMENTS

| | | | | |
|---|---|---|---|---|
| 4,402,349 A | * | 9/1983 | Engert | ................... B01J 8/0015 141/9 |
| 4,433,707 A | * | 2/1984 | Farnham | ................... B01J 8/003 141/1 |

(Continued)

FOREIGN PATENT DOCUMENTS

| | | |
|---|---|---|
| EP | 3061514 A1 | 8/2016 |
| WO | 9920384 | 4/1999 |

*Primary Examiner* — Nicolas A Arnett
(74) *Attorney, Agent, or Firm* — Matthew R. Weaver

(57) ABSTRACT

Particle loading assembly and method for loading particles into a vessel to form a densely packed particle bed comprising an inner layer of particles and an outer layer of particles. The inner layer of particles is arranged radially and concentric with the outer layer of particles. The inner layer of particles contains at least a first type of particle of different granulometry or range of composition or both granulometry and range of composition from a second type of particles contained in the outer layer.

20 Claims, 4 Drawing Sheets

(51) Int. Cl.
  *B01D 53/04* (2006.01)
  *B01J 20/30* (2006.01)
  *B01D 15/20* (2006.01)
  *B01D 53/047* (2006.01)

(56) References Cited

U.S. PATENT DOCUMENTS

| | | |
|---|---|---|
| 5,324,159 A | 6/1994 | Nowobilski et al. |
| 5,819,820 A | 10/1998 | Lehman |
| 5,836,362 A | 11/1998 | Ackley et al. |
| 5,837,021 A | 11/1998 | Lehman |
| 5,897,282 A * | 4/1999 | Comardo ............... B01J 8/002 141/232 |
| 5,931,980 A | 8/1999 | Lehman |
| 5,964,259 A | 10/1999 | Ackley et al. |
| 6,090,351 A | 7/2000 | Euzen et al. |
| 6,276,408 B1 | 8/2001 | Lehman |
| 6,302,162 B2 | 10/2001 | Lehman |
| 6,866,075 B2 | 3/2005 | Whitley et al. |
| 7,226,568 B1 * | 6/2007 | Ham .................. B01D 53/0431 422/218 |
| 7,836,919 B2 * | 11/2010 | Johns .................. B01J 8/003 141/1 |
| 8,101,133 B2 | 1/2012 | Ackley et al. |
| 8,887,773 B2 * | 11/2014 | Cottard .................. B01J 8/002 141/1 |
| 2001/0041117 A1 * | 11/2001 | Comardo ............... B01J 8/002 414/160 |
| 2003/0031536 A1 * | 2/2003 | Boe .................... B01J 8/003 414/160 |
| 2004/0146457 A1 * | 7/2004 | Bence ................. B01J 8/0025 423/650 |
| 2011/0017348 A1 * | 1/2011 | Tanimoto ............... B01J 8/008 141/5 |
| 2011/0083769 A1 | 4/2011 | Sanz et al. |
| 2014/0290788 A1 * | 10/2014 | Dupont ................ B01J 8/004 141/1 |
| 2016/0121288 A1 * | 5/2016 | Stander ............... B01J 8/0025 141/5 |

\* cited by examiner

PARTICLE LOADING METHOD AND APPARATUS FOR A RADIAL FLOW VESSEL

BACKGROUND

The present disclosure relates to loading two or more separate layers of particles, for example adsorbent particles, of different composition and/or granulometry into "radial flow" vessels. Radial flow vessels are used in a number of different processes, most notably processes employing thermal swing adsorption (TSA), pressure swing adsorption (PSA), vacuum swing adsorption (VSA), or vacuum-pressure swing adsorption (VPSA) processes for the separation of components of a fluid, for example, oxygen or nitrogen from air. Radial flow vessels may also be used for reactors containing two or more separate layers of catalyst particles.

In any adsorption vessel, it is often desirable to load different types of adsorbent onto various areas of the adsorbent bed of a vessel to remove or treat different components of a fluid as the fluid passes through the bed of adsorbent. In an axial flow vessel, this involves placing the adsorbents in the vessel in horizontal layers, which is easily accomplished. In a radial flow vessel (i.e. in a vessel where the fluid to be processed flows radially (typically radially inward) through the adsorbent bed), this particle loading is more difficult because in radial flow vessels the particle layers are radially disposed and the interface between the particle layers is oriented parallel with gravity.

Industry desires convenient and cost-effective solutions to the problem of loading vessels (especially large vessels) with two or more distinct, concentric, radially disposed layers of particles. There is a particular need in the field of air separation where large vessels holding adsorbent particles are employed to remove carbon dioxide and water from air prior to further processing by cryogenic distillation. There is a particular need in the field of air separation where large vessels holding adsorbent particles are employed to separate oxygen or nitrogen from air in various adsorption processes. Such processes are particularly sensitive to cost considerations. In such processes, there is an ever-present need for reducing capital, and/or operating costs with a view towards lowering overall cost without compromising product quality, notably purity.

Industry desires to conduct the vessel filling operation at an adequate speed by simultaneously filling the vessel with both (or all) particle types and continuing the filling operation substantially without interruption.

Industry desires a particle loading assembly and method to form radially disposed particle layers without screens or other barriers disposed between the particle layers. Such screens or barriers can help segregate the particle layers during loading, but add to the capital cost of the vessel and are useless or harmful to the efficiency of the operation which the filled vessel is designed to perform.

Industry desires a particle loading assembly and method that provides a uniform and high packing density of particles throughout both (or all) particle layers in the vessel.

Industry desires a particle loading assembly and method that achieves a clean (vertical) and not a jagged interface between adjacent particle layers.

Industry desires a particle loading assembly and method that achieves a sharp interface, i.e. a narrow width of an interfacial zone containing particles from both particle layers.

Related disclosures include U.S. Pat. Nos. 3,620,685, 3,972,686, 4,159,785, 4,541,851, 4,698,072, 5,232,479, 5,324,159, 5,819,820, 5,836,362, 5,837,021, 5,931,980, 5,964,259, 6,276,408, 6,866,075, 8,101,133, EP 3,061,514, and WO 99/20384, each incorporated by reference in their entirety with the proviso that, in case of conflict, the present specification governs.

BRIEF SUMMARY

The present disclosure relates to a particle loading assembly and a method for loading particles into a vessel. More specifically the present disclosure relates to loading two or more separate concentric layers of particles in a radial flow vessel.

There are several aspects of the invention as outlined below. In the following, specific aspects of the invention are outlined below. The reference numbers and expressions set in parentheses are referring to an example embodiment explained further below with reference to the figures. The reference numbers and expressions are, however, only illustrative and do not limit the aspect to any specific component or feature of the example embodiment. The aspects can be formulated as claims in which the reference numbers and expressions set in parentheses are omitted or replaced by others as appropriate.

In a $1^{st}$ aspect, a particle loading assembly for loading particles into a vessel (10) to form a particle bed (20) comprising an inner layer (22) of particles and an outer layer (24) of particles, the inner layer (22) of particles arranged radially and concentric with the outer layer (24) of particles, the inner layer (22) containing at least a first type of particle of different granulometry or range of composition or both granulometry and range of composition from a second type of particle contained in the outer layer (24), comprises:

a sliding barrier (30) (i.e. a slip form) for segregating particles for the inner layer (22) from the particles for the outer layer (24) during loading, the sliding barrier (30) having a top end (32) and a bottom end (34);
   an inner particle distributor (40) for distributing particles for the inner layer (22), the inner particle distributor (40) in fixed spaced relation to the sliding barrier (30), the inner particle distributor (40) having a lowermost particle discharge position, wherein a horizontal plane passing through the lowermost particle discharge position of the inner particle distributor (40) passes through the sliding barrier (30) at a position between the top end (32) and the bottom end (34) of the sliding barrier (30);
   an outer particle distributor (50) for distributing particles for the outer layer (24), the outer particle distributor (50) in fixed spaced relation to the sliding barrier (30), the outer particle distributor (50) having a lowermost particle discharge position, wherein a horizontal plane passing through the lowermost particle discharge position of the outer particle distributor (50) passes through the sliding barrier (30) at a position between the top end (32) and the bottom end (34) of the sliding barrier (30); and
   a hoist for lifting (60) the sliding barrier (30), the inner particle distributor (40), and the outer particle distributor (50) during loading of the particles for the inner and outer layers;
   wherein a first vertical height, $h_1$, is defined between the lowermost particle discharge position of the inner particle distributor (40) and the bottom end (34) of the sliding barrier (30), wherein the first vertical height, $h_1$, is at least 100 mm; and
   wherein a second vertical height, $h_2$, is defined between the lowermost particle discharge position of the outer particle distributor (50) and the bottom end (34) of the sliding barrier (30), wherein the second vertical height, $h_2$, is at least 100 mm.

In a 2$^{nd}$ aspect, the particle loading assembly includes the features according to the 1$^{st}$ aspect, wherein the inner particle distributor (40) comprises a means for dispersing particles (42), wherein the means for dispersing particles (42) comprises at least one of a perforated plate, a wire mesh, an expanded metal, or a plate defining a plurality of orifices with an accompanying particle dispersal assembly associated with each orifice of the plurality of orifices.

In a 3$^{rd}$ aspect, the particle loading assembly includes the features according to the 2$^{nd}$ aspect, wherein the means for dispersing particles (42) comprises the plate defining the plurality of orifices with the accompanying particle dispersal assembly associated with each orifice of the plurality of orifices, wherein each particle dispersal assembly is disposed adjacent to a respective orifice of the plurality of orifices in the plate, wherein each particle dispersal assembly comprises a deflecting surface disposed relative to its respective orifice such that particles can flow vertically from the respective orifice and be dispersed by the deflecting surface.

In a 4$^{th}$ aspect, the particle loading assembly includes the features according to the 3$^{rd}$ aspect, wherein each particle dispersal assembly of the accompanying particle dispersal assemblies comprises a dispersing surface disposed adjacent each respective orifice of the plurality of orifices, wherein a plane tangent to any point on the deflecting surface and a plane tangent to any point on the dispersing surface intersect at an included angle of between about 30 and about 60 degrees, whereby particles can be deflected by the deflecting surface, impinge upon the dispersing surface, and be further dispersed by the dispersing surface.

In a 5$^{th}$ aspect, the particle loading assembly includes the features according to any one of the 2$^{nd}$ through 4$^{th}$ aspects, wherein the inner particle distributor (40) comprises a spreader (44), wherein the spreader (44) comprises at least one of a perforated plate, a wire mesh, or an expanded metal, a particle loading arm, or a plate defining a plurality of orifices with an accompanying particle dispersal assembly associated with each orifice of the plurality of orifices, wherein the spreader (44) of the inner particle distributor (40) is positioned at an elevation above the means for dispersing particles (42) of the inner particle distributor (40).

In a 6$^{th}$ aspect, the particle loading assembly includes the features according to the 5$^{th}$ aspect wherein the spreader (44) of the inner particle distributor (40) comprises the particle loading arm, wherein the particle loading arm comprises
 a conduit section having a first end and a second end, wherein the first end is in particle flow communication with a supply of particles for the inner layer of particles (22), and wherein the conduit section has a plurality of orifices disposed between the first end and the second end; and
 a plurality of particle dispersal assemblies, each particle dispersal assembly being disposed adjacent to a respective orifice in the conduit section, wherein each particle dispersal assembly comprises a deflecting surface disposed relative to its respective orifice such that particles can flow vertically from the respective orifice and be dispersed by the deflecting surface.

In a 7$^{th}$ aspect, the particle loading assembly includes the features according to the 1$^{st}$ aspect, wherein the inner particle distributor (40) comprises a particle loading arm (46), wherein the particle loading arm (46) comprises
 a conduit section having a first end and a second end, wherein the first end is in particle flow communication with a supply of particles for the inner layer of particles (22), and wherein the conduit section has a plurality of orifices disposed between the first end and the second end; and
 a plurality of particle dispersal assemblies, each particle dispersal assembly being disposed adjacent to a respective orifice in the conduit section, wherein each particle dispersal assembly comprises a deflecting surface disposed relative to its respective orifice such that particles can flow vertically from the respective orifice and be dispersed by the deflecting surface.

In an 8$^{th}$ aspect, the particle loading assembly includes the features according to the 7$^{th}$ aspect, wherein each particle dispersal assembly of the particle loading arm (46) of the inner particle distributor (40) further comprises a dispersing surface disposed adjacent to the orifice, wherein a plane tangent to any point on the deflecting surface and a plane tangent to any point on the dispersing surface intersect at an included angle of between about 30 and about 60 degrees, whereby particles can be deflected by the deflecting surface, impinge upon the dispersing surface, and be further dispersed by the dispersing surface.

In a 9$^{th}$ aspect, the particle loading assembly includes the features according to any one of the 1$^{st}$ through 8$^{th}$ aspects, wherein the outer particle distributor (50) comprises a means for dispersing particles (52), wherein the means for dispersing particles (52) of the outer particle distributor (50) comprises at least one of a perforated plate, a wire mesh, an expanded metal, or a plate defining a plurality of orifices with an accompanying particle dispersal assembly associated with each orifice of the plurality of orifices.

In a 10$^{th}$ aspect, the particle loading assembly includes the features according to the 9$^{th}$ aspect, wherein the means for dispersing particles (52) of the outer particle distributor (50) comprises the plate defining the plurality of orifices with the accompanying particle dispersal assembly associated with each orifice of the plurality of orifices, wherein each particle dispersal assembly is disposed adjacent to a respective orifice of the plurality of orifices in the plate, wherein each particle dispersal assembly comprises a deflecting surface disposed relative to its respective orifice such that particles can flow vertically from the respective orifice and be dispersed by the deflecting surface.

In an 11$^{th}$ aspect, the particle loading assembly includes the features according to the 10$^{th}$ aspect, wherein each particle dispersal assembly of the accompanying particle dispersal assemblies of the means for dispersing particles (52) of the outer particle distributor (50) comprises a dispersing surface disposed adjacent each respective orifice of the plurality of orifices, wherein a plane tangent to any point on the deflecting surface and a plane tangent to any point on the dispersing surface intersect at an included angle of between about 30 and about 60 degrees, whereby particles can be deflected by the deflecting surface, impinge upon the dispersing surface, and be further dispersed by the dispersing surface.

In a 12$^{th}$ aspect, the particle loading assembly includes the features according to any one of the 9$^{th}$ through the 11$^{th}$ aspects, wherein the outer particle distributor (50) comprises a spreader (54), wherein the spreader (54) of the outer particle distributor (50) comprises at least one of a perforated plate, a wire mesh, an expanded metal, a particle loading arm, or a plate defining a plurality of orifices with an accompanying particle dispersal assembly associated with each orifice of the plurality of orifices, wherein the spreader (54) of the outer particle distributor (50) is positioned at an elevation above the means for dispersing particles (52) of the outer particle distributor (50).

In a 13th aspect, the particle loading assembly includes the features according to the 12th aspect wherein the spreader (54) of the outer particle distributor (50) comprises the particle loading arm, wherein the particle loading arm of the outer distributor comprises

- a conduit section having a first end and a second end, wherein the first end is in particle flow communication with a supply of particles for the outer layer (24) of particles, and wherein the conduit section has a plurality of orifices disposed between the first end and the second end; and
- a plurality of particle dispersal assemblies, each particle dispersal assembly being disposed adjacent to a respective orifice in the conduit section of the particle loading arm of the outer particle distributor (50), wherein each particle dispersal assembly comprises a deflecting surface disposed relative to its respective orifice such that particles can flow vertically from the respective orifice and be dispersed by the deflecting surface.

In a 14th aspect, the particle loading assembly includes the features according to any one of the 1st through 5th aspects, wherein the outer particle distributor (50) comprises a particle loading arm (56), wherein the particle loading arm (56) of the outer particle distributor (50) comprises

- a conduit section having a first end and a second end, wherein the first end is in particle flow communication with a supply of particles for the outer layer of particles (24), and wherein the conduit section has a plurality of orifices disposed between the first end and the second end; and
- a plurality of particle dispersal assemblies, each particle dispersal assembly being disposed adjacent to a respective orifice in the conduit section, wherein each particle dispersal assembly comprises a deflecting surface disposed relative to its respective orifice such that particles can flow vertically from the respective orifice and be dispersed by the deflecting surface.

In a 15th aspect, the particle loading assembly includes the features according to the 8th aspect, wherein each particle dispersal assembly of the particle loading arm (56) of the outer particle distributor (50) further comprises a dispersing surface disposed adjacent to the orifice, wherein a plane tangent to any point on the deflecting surface and a plane tangent to any point on the dispersing surface intersect at an included angle of between about 30 and about 60 degrees, whereby particles can be deflected by the deflecting surface, impinge upon the dispersing surface, and be further dispersed by the dispersing surface.

In a 16th aspect, a method for loading particles into a vessel (10) to form a particle bed (20) comprising an inner layer (22) of particles and an outer layer (24) of particles, the inner layer (22) of particles arranged radially and concentric with the outer layer (24) of particles, the inner layer (22) containing at least a first type of particle of different granulometry or composition or both granulometry and composition from a second type of particle contained in the outer layer (24), comprises:

- discharging particles for the inner layer (22) from an inner particle distributor (40) onto an upper surface of the inner layer (22) to form the inner layer (22) of particles of increasing height as the particles are discharged, the inner particle distributor (40) having a lowermost particle discharge position;
- discharging particles for the outer layer (24) from an outer particle distributor (50) onto an upper surface of the outer layer (24) to form the outer layer (24) of particles of increasing height as the particles are discharged, the outer particle distributor (50) having a lowermost particle discharge position;
- segregating the particles for the inner layer (22) from the particles for the outer layer (24) with a sliding barrier (30) while the particles for the inner layer and the particles for the outer layer are discharged, the sliding barrier (30) having a top end (32) and a bottom end (34); and
- lifting the sliding barrier (30) from a lower section of the vessel (10) to an upper section of the vessel (10) thereby placing the inner layer (22) of particles located below a horizontal plane passing through the bottom end of the sliding barrier (30) in direct contact along an interfacial zone with the outer layer (24) of particles located below the horizontal plane passing through the bottom end of the sliding barrier (30);
- wherein the lowermost particle discharge position of the inner particle distributor (40) is maintained from 70 mm to 2500 mm above the upper surface of the inner layer (22) during the step of discharging particles for the inner layer (22);
- wherein the lowermost particle discharge position of the outer particle distributor (50) is maintained from 70 mm to 2500 mm above the upper surface of the outer layer (24) during the step of discharging particles for the outer layer (24); and
- wherein the bottom end of the sliding barrier is maintained at a position ranging from below the upper surface of the inner layer to no more than 20 mm or no more than 10 mm above the upper surface of the inner layer and ranging from below the upper surface of the outer layer to no more than 20 mm or no more than 10 mm above the upper surface of the outer layer during the step of lifting the sliding barrier.

In a 17th aspect, the method includes the features according to the 16th aspect wherein the bottom end (34) of the sliding barrier (30) is maintained below the upper surface of the inner layer (22) and below the upper surface of the outer layer (24) during the step of lifting the sliding barrier (30).

In an 18th aspect, the method includes the features according to the 16th aspect or the 17th aspect, wherein the top end (32) of the sliding barrier (30) is maintained above the upper surface of the inner layer (22) during discharging particles for the inner layer (22) and the sliding barrier (30) is maintained above the upper surface of the outer layer (24) during discharging particles for the outer layer (24).

In a 19th aspect, the method includes the features according to any one of the 16th through 18th aspects wherein the top end (32) of the sliding barrier (30) is maintained above the lowermost particle discharge position of the inner particle distributor (40) during discharging particles for the inner layer (22) and the top end (32) of the sliding barrier (30) is maintained above the lowermost particle discharge position of the outer particle distributor (50) during discharging particles for the outer layer (24).

In a 20th aspect, the method includes the features according to any one of the 16th through 18th aspects wherein the inner particle distributor (40) has an uppermost particle discharge position at an elevation higher than the lowermost particle discharge position for the inner particle distributor (40), wherein the outer particle distributor (50) has an uppermost particle discharge position at an elevation higher than the lowermost particle discharge position for the outer particle distributor (50), wherein the top end of the sliding barrier (30) is maintained above the uppermost particle discharge position of the inner particle distributor (40) and above the uppermost particle discharge position of the outer particle distributor (50).

In a 21$^{st}$ aspect, the method includes the features according to any one of the 16$^{th}$ through 20$^{th}$ aspects wherein the lower section of the vessel is in the lower half of the vessel (10) and the upper section of the vessel is in the upper half of the vessel (10).

In a 22$^{nd}$ aspect, the method includes the features according to any one the 16$^{th}$ through 21$^{st}$ aspects wherein the sliding barrier (30) is lifted to a final elevation in the vessel (10) and the inner particle distributor (40), the outer particle distributor (50), and the sliding barrier (30) are left in the vessel after completion of loading the particles into the vessel (10).

In a 23$^{rd}$ aspect, the method includes the features according to any one of the 16$^{th}$ through 22$^{nd}$ aspects wherein the lowermost particle discharge position of the inner particle distributor (40) is maintained from 70 mm to 2500 mm above the upper surface of the inner layer (22) during the step of discharging particles for the inner layer (22), the lowermost particle discharge position of the outer particle distributor (50) is maintained from 70 mm to 2500 mm above the upper surface of the outer layer (24) during the step of discharging particles for the outer layer (24), and the bottom end (34) of the sliding barrier (30) is maintained below the upper surface of the inner layer (22) and below the upper surface of the outer layer (24) during the step of lifting the sliding barrier (30) by
- sensing whether particles of the inner layer are below a lower limit level for the inner layer using a first probe (72) and generating signals in response thereto;
- sensing whether particles of the inner layer are above an upper limit level for the inner layer using a second probe (74) and generating signals in response thereto;
- sensing whether particles of the outer layer are below a lower limit level for the outer layer using a third probe (82) and generating signals in response thereto;
- sensing whether particles of the outer layer are above an upper limit level for the outer layer using a fourth probe (84) and generating signals in response thereto; and
- providing particles to the inner particle distributor (40), providing particles to the outer particle distributor (50), and lifting the sliding barrier (30) responsive to the signals from the first probe (72), the second probe (74), the third probe (82), and the fourth probe (84).

In a 24$^{th}$ aspect, the method includes the features according to the 23$^{rd}$ aspect wherein particles are provided to the inner layer at a volumetric rate greater than a volumetric rate of providing particles to the outer layer responsive to the first probe (72) for the inner layer generating signals indicating that the particles of the inner layer are below the lower limit level for the inner layer at the same time the third probe (82) is generating signals indicating that the particles of the outer layer are above the lower limit level for the outer layer.

In a 25$^{th}$ aspect, the method includes the features according to the 23$^{rd}$ aspect or the 24$^{th}$ aspect wherein particles are provided to the outer layer at a volumetric rate greater than a volumetric rate of providing particles to the inner layer responsive to the first probe (72) generating signals indicating that the particles of the inner layer are above the lower limit level for the inner layer at the same time the third probe (82) is generating signals indicating that the particles of the outer layer are below the lower limit level for the outer layer.

In a 26$^{th}$ aspect, the method includes the features according to any one of the 23$^{rd}$ through 25$^{th}$ aspects wherein the sliding barrier (30) is lifted responsive to the second probe (74) generating signals indicating that the particles of the inner layer are above the upper limit level for the inner layer at the same time the fourth probe (84) is generating signals indicating that the particles of the outer layer are above the upper limit level for the outer layer, the sliding barrier lifted until at least one of (i) the second probe (74) generates signals indicating that the particles of the inner layer are below the upper limit level for the inner layer or (ii) the fourth probe (84) generates signals indicating that the particles of the outer layer are below the upper limit level for the outer layer.

In a 27$^{th}$ aspect, the method includes the features according to any one of the 23$^{rd}$ to 26$^{th}$ aspects wherein lifting of the sliding barrier (30) is slowed or halted responsive to the first probe (72) generating signals indicating that the particles of the inner layer are below the lower limit level for the inner layer at the same time the third probe (82) is generating signals indicating that the particles of the outer layer are below the lower limit level for the outer layer.

In a 28$^{th}$ aspect, a particle loading assembly for loading particles into a vessel (110) to form a particle bed (120) comprising an inner layer (122) of particles and an outer layer (124) of particles, the inner layer (122) of particles arranged radially and concentric with the outer layer (124) of particles, the inner layer (122) containing a first type of particles of different granulometry or range of composition or both granulometry and range of composition from a second type of particle contained in the outer layer (124), the vessel (110) having an upper end (111) and a lower end (112), comprises:
- a sliding barrier (130) (i.e. a slip form) for segregating particles for the inner layer (122) from the particles for the outer layer (124) during loading, the sliding barrier (130) having a top end (132) and a bottom end (134), the sliding barrier (130) having an inner layer side (131) and an outer layer side (133);
- a hoist for lifting (160) the sliding barrier (130) during loading of the particles for the inner and outer layers;
- an inner particle distributor (140) for distributing particles for the inner layer (122), the inner particle distributor (140) in fixed spaced relation to the upper end (111) of the vessel (110);
- an outer particle distributor (150) for distributing particles for the outer layer (124), the outer particle distributor (150) in fixed spaced relation to the upper end (111) of the vessel (110); and
- a dividing curtain (170) in fixed spaced relation to the upper end (111) of the vessel (110) operatively disposed to direct particles discharged from the inner particle distributor (140) to the inner layer side (131) of the sliding barrier (130) and to direct the particles discharged from the outer particle distributor (150) to the outer layer side (133) of the sliding barrier (130).

In a 29$^{th}$ aspect, a method for loading particles into a vessel (110) to form a particle bed (120) comprising an inner layer (122) of particles and an outer layer (124) of particles, the inner layer (122) of particles arranged radially and concentric with the outer layer (124) of particles, the inner layer (122) containing at least a first type of particle of different granulometry or composition or both granulometry and composition from a second type of particle contained in the outer layer (124), the vessel (110) having an upper end (111) and a lower end (112), comprises:

discharging particles for the inner layer (122) from an inner particle distributor (140) onto an upper surface of the inner layer (122) to form the inner layer (122) of particles of increasing height as the particles are discharged, wherein the inner particle distributor (140) is in fixed spaced relation to the upper end (111) of the vessel (110);

discharging particles for the outer layer (124) from an outer particle distributor (150) onto an upper surface of the outer layer (124) to form the outer layer (124) of particles of increasing height as the particles are discharged, wherein the outer particle distributor (150) is in fixed spaced relation to the upper end (111) of the vessel (110);

segregating the particles for the inner layer (122) from the particles for the outer layer (124) with a sliding barrier (130) while the particles for the inner layer and the particles for the outer layer are discharged, the sliding barrier (130) having a top end (132) and a bottom end (134); and lifting the sliding barrier (130) from a lower section of the vessel (110) to an upper section of the vessel (110) thereby placing the inner layer (122) of particles located below a horizontal plane passing through the bottom end of the sliding barrier (130) in direct contact along an interfacial zone with the outer layer (124) of particles located below the horizontal plane passing through the bottom end of the sliding barrier (130);

wherein the bottom end of the sliding barrier is maintained at a position ranging from below the upper surface of the inner layer to no more than 20 mm or no more than 10 mm above the upper surface of the inner layer and ranging from below the upper surface of the outer layer to no more than 20 mm or no more than 10 mm above the upper surface of the outer layer during the step of lifting the sliding barrier.

DETAILED DESCRIPTION OF THE PREFERRED EMBODIMENTS

Figure 1:
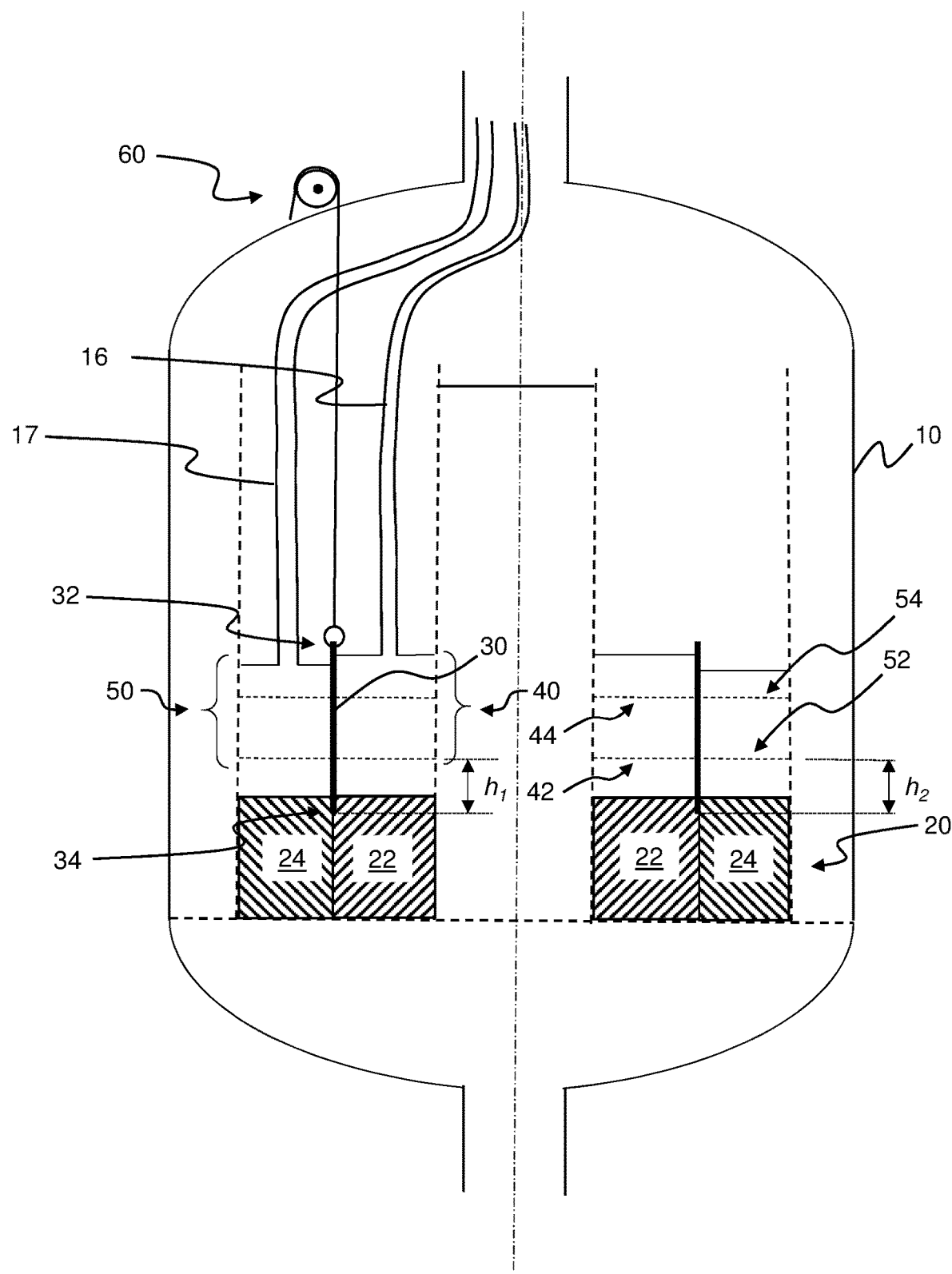
FIG. 1 depicts an axial cross-sectional view of a first embodiment of a particle loading assembly according to the present disclosure.

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention, it being understood that various changes may be made in the function and arrangement of elements without departing from the scope of the invention as defined by the claims.

The articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

The adjective "any" means one, some, or all indiscriminately of whatever quantity.

The term "and/or" placed between a first entity and a second entity includes any of the meanings of (1) only the first entity, (2) only the second entity, and (3) the first entity and the second entity. The term "and/or" placed between the last two entities of a list of 3 or more entities means at least one of the entities in the list including any specific combination of entities in this list. For example, "A, B and/or C" has the same meaning as "A and/or B and/or C" and comprises the following combinations of A, B and C: (1) only A, (2) only B, (3) only C, (4) A and B and not C, (5) A and C and not B, (6) B and C and not A, and (7) A and B and C.

The phrase "at least one of" preceding a list of features or entities means one or more of the features or entities in the list of entities, but not necessarily including at least one of each and every entity specifically listed within the list of entities and not excluding any combinations of entities in the list of entities. For example, "at least one of A, B, or C" (or equivalently "at least one of A, B, and C" or equivalently "at least one of A, B, and/or C") has the same meaning as "A and/or B and/or C" and comprises the following combinations of A, B and C: (1) only A, (2) only B, (3) only C, (4) A and B and not C, (5) A and C and not B, (6) B and C and not A, and (7) A and B and C.

The term "plurality" means "two or more than two."

As used herein, "vertical" and "vertically" have their customary meaning. The vertical direction is aligned with gravity. "Vertical" means plumb, i.e. straight up or down. The vertical direction can be determined with a plumb line.

A "horizontal plane" is a plane normal to vertical.

The terms "top", "bottom", "upper", "lower", "uppermost", and "lowermost", each have their normal and customary meaning consistent with the context each term is used. To avoid any doubt, the "top" of an object is the end further from the center of the earth than the "bottom" end of the object, the "upper" end of an object is further from the center of the earth than the "lower" end of the object, the "uppermost" is further from the center of the earth than the "lowermost". A "lowermost" position means a lowest position with respect to a vertical line aligned with gravity, i.e. a plumb line. An "uppermost" position means a highest position with respect to a vertical line aligned with gravity.

The term "granulometry" refers particle properties such as size range, shape (e.g. spherical, cylindrical or extruded, and/or non-uniform), porosity range, and texture.

As used herein, "different adsorbents," "different particle types," or "different particulate materials," means two or more adsorbents or particles (at least one of which can be in the form of an adsorbent mixture or particle mixture) differing from one another in granulometry and/or range of composition. "Composition" refers to the chemical makeup of a material. The range of composition for a material refers to the range of each chemical species, in weight %, making up the material. The term "different types of particles" means that two or more groups of particles differ in one or more of physical properties, chemical properties, and size distribution. For example, particles of one particle type may be 100 weight % aluminum oxide, particles of another different particle type may be 100 weight % silicon oxide, and particles of another different particle type may be 8 to 40 weight % aluminum oxide, 40 to 90 weight % silicon oxide, 0 to 7 weight % lithium cation, 0 to 17 weight % sodium cation, and 0 to 10 weight % calcium cation.

In the claims, letters may be used to identify claimed steps (e.g. (a), (b), and (c)). These letters are used to aid in referring to the method steps and are not intended to indicate the order in which claimed steps are performed, unless and only to the extent that such order is specifically recited in the claims.

The present disclosure relates to a particle loading assembly and method for loading particles into a vessel.

The particle loading assembly and method are described with reference to the figures.

While the description describes the particle loading assembly and method for forming two layers of particles, the disclosure is not limited to two layers of particles. The terms "inner" and "outer" refer to relationship between two adjacent layers of particles in a radial flow vessel. An additional layer of particles may be formed inner to and adjacent to the inner layer 22 of particles. Likewise, an additional layer of particles may be formed outer to and adjacent to the outer layer 24 of particles.

The particle loading assembly is for loading particles into a vessel 10 to form a particle bed 20 comprising an inner layer 22 of particles and an outer layer 24 of particles. The inner layer 22 of particles is arranged radially and concentric with the outer layer 24 of particles. The inner layer 22 of particles and the outer layer 24 of particles are in direct contact along an interfacial zone after loading.

As used herein "direct contact along an interfacial zone" means an interfacial zone without mixing of the particles from the different particle layers separated by the interfacial zone, or an interfacial zone with a narrow radial width containing a mixture of particles from the adjacent layers, free from any structural barrier, such as a screen, interposed between the two adjacent particle layers. The width of the interfacial zone may range from 0 mm for perfectly segregated particle layers, to 10 times a mean particle diameter, where the mean particle diameter is for the particles of the layer having the greater mean particle diameter.

The inner layer 22 contains at least a first type of particle of different granulometry or range of composition or both granulometry and range of composition from a second type of particle contained in the outer layer 24.

For example, the inner layer may contain particles of activated alumina with surface area of 100 to 300 m²/g or silica gel of surface area 200 to 800 m²/g, and the outer layer may contain particles of zeolitic material with cations of lithium, sodium, magnesium, potassium, and/or calcium.

The innermost surface and the outermost surface of the radial flow bed may be supported by cylindrical partitions as is known in the art. The cylindrical partitions may be perforated metal plates or other suitable structure known in the art.

The particle loading assembly comprises a sliding barrier 30 (i.e. a slip form) for segregating particles for the inner layer 22 from the particles for the outer layer 24 during loading. The sliding barrier 30 segregates the particles during loading and is lifted during loading of the particles leaving the particles forming each layer in direct contact along an interfacial zone. The sliding barrier 30 has a top end 32 and a bottom end 34. The sliding barrier may be made from metal. The thickness of the sliding barrier may range from 1 mm to 20 mm, where the thickness is chosen in order to support the weight of the adsorbent material on the inner and outer surface of the sliding barrier. Slip forms are known, for example, from U.S. Pat. Pub. No. 2001/002600.

The particle loading assembly comprises an inner particle distributor 40 for distributing particles for the inner layer 22. The inner particle distributor 40 is in fixed spaced relation to the sliding barrier 30. The inner particle distributor 40 is connected to the sliding barrier 30 such that when the sliding barrier 30 is lifted during loading the particles, the inner particle distributor 40 is lifted coextensive with the sliding barrier 30. The inner particle distributor 40 has a lowermost particle discharge position. A horizontal plane that passes through the lowermost particle discharge position of the inner particle distributor passes through sliding barrier 30 at a position between the top end 32 and the bottom end 34 of the sliding barrier 30. One, more than one, or all of the particle discharge locations may lie in the horizontal plane that passes through the lowermost particle discharge position.

As illustrated in FIG. 1, the inner particle distributor 40 may comprise a means for dispersing particles 42 wherein the means for dispersing particles comprises at least one of a perforated plate, a wire mesh, an expanded metal, or a plate defining a plurality of orifices with an accompanying particle dispersal assembly associated with each orifice of the plurality of orifices. In FIG. 1, all of the discharge locations in the means for dispersing particles 42 lie in the horizontal plane passing through the lowermost particle discharge position (i.e. all of the particle discharge locations are at the same height and correspond to the lowermost particle discharge position).

The openings in the means for dispersing particles 42 are sized to permit the particles for forming the inner layer to pass through and distribute the particles onto the top of the inner layer under the area of the means for dispersing particles. The cross section of the openings may be of any shape. The ratio of the effective diameter to the mean particle diameter may be in the range of about 2 to about 12 and preferably at least about 5. In case the openings are not circular, the opening diameter for the ratio is the equivalent diameter for the opening, which is defined herein as the diameter giving the same cross-sectional area (i.e.

$$D_{equivalent} = 2 \times \sqrt{\frac{A_{opening}}{\pi}}.$$

(For example, for an opening in the means for dispersing particles 42 that is square have sides of length, a, the equivalent diameter is $2 \times a/\sqrt{\pi}$). Suitable sizing of the perforated plate or wire mesh or expanded metal can be readily determined without undue experimentation. The open area of the means to disperse the particles may be greater than the open area of the spreader.

For the case where the means for dispersing particles 42 comprises the plate defining the plurality of orifices with the accompanying particle dispersal assembly associated with each orifice of the plurality of orifices, each particle dispersal assembly is disposed adjacent to a respective orifice of the plurality of orifices in the plate, wherein each particle dispersal assembly comprises a deflecting surface disposed relative to its respective orifice such that particles can flow vertically from the respective orifice and be dispersed by the deflecting surface.

Each particle dispersal assembly of the accompanying particle dispersal assemblies may further comprise a dispersing surface disposed adjacent each respective orifice of the plurality of orifices, wherein a plane tangent to any point on the deflecting surface and a plane tangent to any point on the dispersing surface intersect at an included angle of between about 30 and about 60 degrees, whereby particles can be deflected by the deflecting surface, impinge upon the dispersing surface, and be further dispersed by the dispersing surface. The dispersing surface may be arranged such that the projection of each respective orifice does not intersect the dispersing surface.

The deflecting surfaces and dispersing surfaces are as described in U.S. Pat. No. 6,866,075 B2, incorporated herein by reference.

As illustrated in FIG. 1, the inner particle distributor 40 may comprise a spreader 44. The spreader 44 may comprise at least one of a perforated plate, wire mesh, an expanded metal, or a plate defining a plurality of orifices with an accompanying particle dispersal assembly associated with each orifice of the plurality of orifices. The spreader 44 is above the means for dispersing particles 42 and functions to spread the particles from a telescopic pipe 16 over the surface of the means for dispersing particles 42. The telescopic pipe 16 is in particle flow communication with a supply of particles for the inner layer. The openings in the spreader are sized to permit the particles for forming the inner layer to pass through and distribute the particles onto the means for dispersing particles 42. The cross section of the openings in the spreader may be of any shape. The ratio of the effective diameter to the mean particle diameter for the spreader 44 may be generally greater than the ratio of the effective diameter to the mean particle diameter for the means for dispersing particles 42. The ratio of the effective diameter to the mean particle diameter for the spreader 44 may be preferably at least about 2, and may be in the range of about 2 to about 12. Suitable sizing of the perforated plate or wire mesh or expanded metal for the spreader 44 can be readily determined without undue experimentation.

Alternatively, the spreader 44 of the inner particle distributor 40 may comprise a particle loading arm. The spreader 44 of the inner particle distributor 40 may comprise more than one particle loading arm. The particle loading arm comprises a conduit section having a first end and a second end. The first end is in particle flow communication with a supply of particles for the inner layer of particles 22. The conduit section has a plurality of orifices disposed between the first end and the second end of the conduit section. The particle loading arm also comprises a plurality of particle dispersal assemblies. Each particle dispersal assembly is disposed adjacent to a respective orifice in the conduit section. Each particle dispersal assembly comprises a deflecting surface disposed relative to its respective orifice such that particles can flow vertically from the respective orifice and be dispersed by the deflecting surface.

Figure 2:
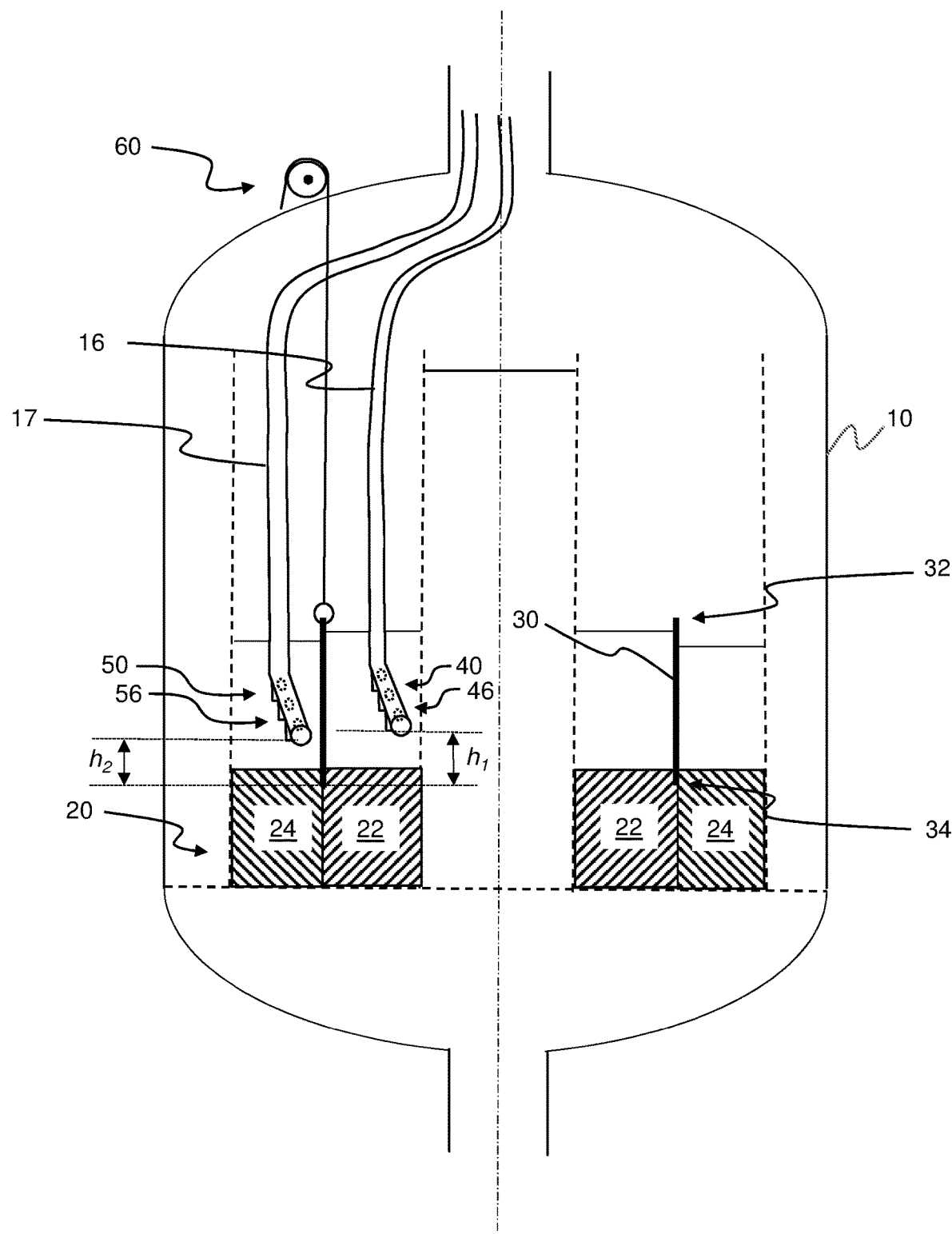
FIG. 2 depicts an axial cross-sectional view of a second embodiment of a particle loading assembly according to the present disclosure.

As illustrated in FIG. 2, the inner particle distributor 40 may comprise a particle loading arm 46. The inner particle distributor 40 may comprise more than one particle loading arms 46. The particle loading arm 46 comprises a conduit section having a first end and a second end. The first end is in particle flow communication with a supply of particles for the inner layer of particles. The conduit section has a plurality of orifices in the lower surface of a portion of the conduit section between the first end and the second end of the conduit section. The orifices may be of any shape but may conveniently be circular holes. The ratio of the orifice diameter to the mean particle diameter may be preferably at least about 4, and may be in the range of about 4 to about 16. In case the orifice is not circular, the orifice diameter for the ratio is the equivalent diameter for the orifice, which is defined herein as the diameter giving the same cross-sectional area (i.e.

$$D_{equivalent} = 2 \times \sqrt{\frac{A_{orifice}}{\pi}}.$$

(For example, for an orifice that is square have sides of length, a, the equivalent diameter is $2 \times a/\sqrt{\pi}$). Each particle loading arm comprises a conduit section which may be formed from a pipe having a circular cross-section, a tube having a shape of any desired cross-section, or a channel which is open on the upper side, or combinations thereof. Particle loading arms are preferably self-supporting, but may include reinforcing brackets or bracing as needed. The axis of the conduit forming each particle loading arm typically is oriented between about 45 degree and 70 degrees from vertical. A useful angle has been found to be 60 degrees.

The particle loading arm also comprises a plurality of particle dispersal assemblies which distribute particles from the orifices to form a dense, uniform particle bed. Each particle dispersal assembly is disposed adjacent to a respective orifice in the conduit section. Each particle dispersal assembly comprises a deflecting surface which is fixed relative to the respective orifice such that particles flowing from the respective orifice can impinge upon and can be dispersed by the deflecting surface.

Each particle dispersal assembly may further comprise a dispersing surface disposed adjacent to the orifice, wherein a plane tangent to any point on the dispersing surface intersect at an included angle of between about 30 and about 60 degrees, whereby particles can be deflected by the deflecting surface, impinge upon the dispersing surface, and be further dispersed by the dispersing surface. The deflecting and dispersing surfaces may be planar. The dispersing surface may be oriented such that the projection of the orifice does not intersect the dispersing surface.

The lowermost particle discharge position of the inner particle distributor 40 corresponds to the lower of the bottom of the deflecting surface or the bottom of the dispersing surface, if present.

Particle loading arms suitable for the present particle loading assembly are known from U.S. Pat. No. 6,866,075, incorporated herein by reference.

The particle loading assembly comprises an outer particle distributor 50 for distributing particles for the outer layer 24. The outer particle distributor 50 is in fixed spaced relation to the sliding barrier 30. The outer particle distributor 50 is connected to the sliding barrier 30 such that when the sliding barrier 30 is lifted during loading the particles for the outer layer, the outer particle distributor 50 is lifted coextensive with the sliding barrier 30. The outer particle distributor 50 has a lowermost particle discharge position. A horizontal plane that passes through the lowermost particle discharge position of the outer particle distributor 50 passes through sliding barrier 30 at a position between the top end 32 and the bottom end 34 of the sliding barrier 30. One, more than one, or all of the particle discharge locations may lie in the horizontal plane that passes through the lowermost particle discharge position of the outer particle distributor 50.

As illustrated in FIG. 1, the outer particle distributor 50 may comprise a means for dispersing particles 52 wherein the means for dispersing particles comprises at least one of a perforated plate, a wire mesh, an expanded metal, a plate defining a plurality of orifices with an accompanying particle dispersal assembly associated with each orifice of the plurality of orifices. In FIG. 1, all of the discharge locations in the means for dispersing particles 52 lie in the horizontal plane passing through the lowermost particle discharge position (i.e. all of the particle discharge locations are at the same height and correspond to the lowermost particle discharge position).

The openings in the means for dispersing particles 52 are sized to permit the particles for forming the outer layer to pass through and distribute the particles onto the top of the outer layer under the area of the means for dispersing particles. The cross section of the openings may be of any shape. The ratio of the effective diameter to the mean particle diameter may be preferably at least about 2, and may be in the range of about 2 to about 12. In case the orifice is not circular, the orifice diameter for the ratio is the equivalent diameter for the opening. Suitable sizing of the perforated plate or wire mesh or expanded metal can be readily determined without undue experimentation.

For the case where the means for dispersing particles 52 of the outer particle distributor 50 comprises the plate defining the plurality of orifices with the accompanying particle dispersal assembly associated with each orifice of the plurality of orifices, each particle dispersal assembly is disposed adjacent to a respective orifice of the plurality of orifices in the plate, wherein each particle dispersal assembly comprises a deflecting surface disposed relative to its respective orifice such that particles can flow vertically from the respective orifice and be dispersed by the deflecting surface.

Each particle dispersal assembly of the accompanying particle dispersal assemblies may further comprise a dispersing surface disposed adjacent each respective orifice of the plurality of orifices, wherein a plane tangent to any point on the deflecting surface and a plane tangent to any point on the dispersing surface intersect at an included angle of between about 30 and about 60 degrees, whereby particles can be deflected by the deflecting surface, impinge upon the dispersing surface, and be further dispersed by the dispersing surface. The dispersing surface may be arranged such that the projection of each respective orifice does not intersect the dispersing surface.

As illustrated in FIG. 1, the outer particle distributor 50 may comprise a spreader 54. The spreader 54 may comprise at least one of a perforated plate, wire mesh, an expanded metal, or a plate defining a plurality of orifices with an accompanying particle dispersal assembly associated with each orifice of the plurality of orifices. The spreader 54 is above the means for dispersing particles 52 and functions to spread the particles from a telescopic pipe 17 over the surface of the means for dispersing particles 52. The telescopic pipe 17 is in particle flow communication with a supply of particles for the outer layer.

Alternatively, the spreader 54 of the outer particle distributor 50 may comprise a particle loading arm. The spreader 54 of the outer particle distributor 50 may comprise more than one particle loading arm. The particle loading arm comprises a conduit section having a first end and a second end. The first end is in particle flow communication with a supply of particles for the outer layer of particles 24. The conduit section has a plurality of orifices disposed between the first end and the second end of the conduit section. The particle loading arm also comprises a plurality of particle dispersal assemblies. Each particle dispersal assembly is disposed adjacent to a respective orifice in the conduit section. Each particle dispersal assembly comprises a deflecting surface disposed relative to its respective orifice such that particles can flow vertically from the respective orifice and be dispersed by the deflecting surface.

As illustrated in FIG. 2, the outer particle distributor 50 may comprise a particle loading arm 56. The outer particle distributor 50 may comprise more than one particle loading arms 56. The particle loading arm 56 comprises a conduit section having a first end and a second end. The first end is in particle flow communication with a supply of particles for the outer layer of particles. The conduit section has a plurality of orifices in the lower surface of a portion of the conduit section between the first end and the second end of the conduit section. The orifices may be of any shape but may conveniently be circular holes. The ratio of the orifice diameter to the mean particle diameter may be preferably at least about 4, and may be in the range of about 4 to about 16. In case the orifice is not circular, the orifice diameter for the ratio is the equivalent diameter for the orifice. Each particle loading arm 56 comprises a conduit section which may be formed from a pipe having a circular cross-section, a tube having a shape of any desired cross-section, or a channel which is open on the upper side, or combinations thereof. Particle loading arms are preferably self-supporting, but may include reinforcing brackets or bracing as needed. The axis of the conduit forming each particle loading arm 56 typically is oriented between about 45 degree and 70 degrees from vertical. A useful angle has been found to be 60 degrees.

The particle loading arm 56 also comprises a plurality of particle dispersal assemblies which distribute particles from the orifices to form a dense, uniform particle bed. Each particle dispersal assembly is disposed adjacent to a respective orifice in the conduit section. Each particle dispersal assembly comprises a deflecting surface which is fixed relative to the respective orifice such that particles flowing from the respective orifice can impinge upon and can be dispersed by the deflecting surface.

Each particle dispersal assembly may further comprise a dispersing surface disposed adjacent to the orifice, wherein a plane tangent to any point on the dispersing surface intersect at an included angle of between about 30 and about 60 degrees, whereby particles can be deflected by the deflecting surface, impinge upon the dispersing surface, and be further dispersed by the dispersing surface. The deflecting and dispersing surfaces may be planar. The dispersing surface may be oriented such that the projection of the orifice does not intersect the dispersing surface.

The lowermost particle discharge position of the outer particle distributor 50 corresponds to the lower of the bottom of the deflecting surface or the bottom of the dispersing surface, if present.

Generally, the inner particle distributor 40 and the outer particle distributor 50 will employ similar means for dispersing particles 42 or particle loading arms. However, it is acceptable to use a means for dispersing particles 42 for the inner particle distributor 40 and a particle loading arm 56 for the outer particle distributor 50 or a particle loading arm 46 for the inner particle distributor 40 and a means for dispersing particles 52 for the outer particle distributor 50.

As illustrated in the figures, a first vertical height, $h_1$, can be defined between the lowermost particle discharge position of the inner particle distributor 40 and the bottom end 34 of the sliding barrier 30. The first vertical height, $h_1$, is the distance between a horizontal plane passing through the lowermost particle discharge position of the inner particle distributor 40 and a horizontal plane passing through the bottom end 34 of the sliding barrier 30.

The first vertical height, $h_1$, is selected to provide a sufficient drop height from the lowermost particle discharge position to the surface of the inner layer that results in a dense packing. Dense packing refers to the deliberate and controlled dispensing of particles of by allowing particles to achieve sufficient velocity so that individual particles are driven into the top surface of the bed upon impact whereupon a uniform packing of the particles is achieved throughout the bed with minimal void space between the particles. Dense packing is achieved by controlling such material loading parameters as the flowrate and distribution of particle, and maintaining a minimum distance between the loading distributor and the top of the bed. Such dense loading methods are to be contrasted with typical prior art "loose pack" methods wherein the particles are dumped through a port or sock in bulk and are spread by flowing along the surface of the bed. Such loose packings are characterized by lower packing density (as much as 10% lower) and higher void fraction compared to the dense loading methods of the present disclosure. A dense packing of adsorbent is desirable because it is a means to ensure uniform particle packing density throughout the vessel, radially, circumferentially, and axially. Uniform particle packing will provide constant resistance to flow through the vessel. In non-uniform particle packing density vessels, areas of low density would allow preferential flow through that region, which will decrease the efficiency of the intended process.

During particle loading, only a relatively short section of the sliding barrier 30 needs to remain between the inner layer and the outer layer, although a longer section may be acceptable.

The first vertical height, $h_1$, is at least 100 mm. The first vertical height, $h_1$, will generally be less than about 2500 mm.

As illustrated in the figures, a second vertical height, $h_2$, can be defined between the lowermost particle discharge position of the outer particle distributor 50 and the bottom end 34 of the sliding barrier 30. The second vertical height, $h_2$, is the distance between a horizontal plane passing through the lowermost particle discharge position of the outer particle distributor 50 and a horizontal plane passing through the bottom end 34 of the sliding barrier 30.

The second vertical height, $h_2$, is selected to provide a sufficient drop height from the lowermost particle discharge position to the surface of the outer layer that results in a dense packing. During particle loading, only a relatively short section of the sliding barrier 30 needs to remain between the inner layer and the outer layer, although a longer section may be acceptable.

The second vertical height, $h_2$, is at least 100 mm. The second vertical height, $h_2$, will generally be less than about 2500 mm.

The particle loading assembly comprises a hoist 60 for lifting the sliding barrier 30, the inner particle distributor 40, and the outer particle distributor 50 during loading of the particles for the inner and outer layers. As used herein, a "hoist" is any device capable of lifting the sliding barrier and particle distributors.

The present disclosure also relates to a method for loading particles into a vessel 10 to form a particle bed 20 comprising an inner layer 22 of particles and an outer layer 24 of particles. The inner layer 22 of particles is arranged radially and concentric with the outer layer 24 of particles. The inner layer 22 of particles and the outer layer 24 of particles are in direct contact along an interfacial zone upon completing the method for loading particles.

The inner layer 22 contains at least a first type of particle of different granulometry or range of composition or both granulometry and range of composition from a second type of particle contained in the outer layer 24.

The method comprises discharging particles for the inner layer 22 from an inner particle distributor 40 onto an upper surface of the inner layer 22 to form the inner layer 22 of particles of increasing height as the particles are discharged. The upper surface of the inner layer 22 is defined by the uppermost particles at rest in the bed of particles in the inner layer 22.

The inner particle distributor 40 may be as described above for the inner particle distributor 40 of the particle loading assembly. The inner particle distributor 40 has a lowermost particle discharge position. The lowermost particle discharge position of the inner particle distributor 40 is maintained from 70 mm to 2500 mm above the upper surface of the inner layer 22 during the step of discharging particles for the inner layer 22. By maintaining the lowermost particle discharge position of the inner particle distributor 40 at least 70 mm above the upper surface of the inner layer 22, the inner layer 22 of particles can be formed as a dense packing.

The method comprises discharging particles for the outer layer 24 from an outer particle distributor 50 onto an upper surface of the outer layer 24 to form the outer layer 24 of particles of increasing height as the particles are discharged. The upper surface of the outer layer 24 is defined by the uppermost particles at rest in the bed of particles in the outer layer 24.

Discharging particles for the inner layer 22 may be simultaneous with discharging particles for the outer layer 24.

Alternatively, in a first stepwise process, particles for the inner layer 22 may be discharged for the inner layer until the inner layer 22 reaches a selected intermediate height, followed by particles for the outer layer 24 being discharged for the outer layer until the outer layer 24 reaches substantially the same intermediate height, followed by the sliding barrier being lifted. This first stepwise process may be repeated until the desired bed height is reached.

Alternatively, in a second stepwise process, particles for the outer layer 24 may be discharged for the outer layer until the outer layer 24 reaches a selected intermediate height, followed by particles for the inner layer 22 being discharged for the inner layer until the inner layer 22 reaches substantially the same intermediate height, followed by the sliding barrier being lifted. This second stepwise process may be repeated until the desired bed height is reached.

Alternatively, the first stepwise process and the second stepwise process may be used alternately in any desired manner.

The outer particle distributor 50 for the method may be as described above for the particle loading assembly. The outer particle distributor 50 has a lowermost particle discharge position. The lowermost particle discharge position of the outer particle distributor 50 is maintained from 70 mm to 2500 mm above the upper surface of the outer layer 24 during the step of discharging particles for the outer layer 24. By maintaining the lowermost particle discharge position of the outer particle distributor at least 70 mm above the upper surface of the outer layer 24, the outer layer 24 of particles can be formed as a dense packing. The upper limit of 2500 mm correlates with the height of the sliding barrier 30. The height of the sliding barrier 30 is selected based upon construction costs and its orientation in the top of the vessel after loading the particles so as to limit the extra height of the vessel needed simply to accommodate the sliding barrier 30.

The method for loading particles comprises segregating the particles for the inner layer 22 from the particles for the outer layer 24 with a sliding barrier 30 while the particles for the inner layer and the particles for the outer layer 24 are being discharged. The sliding barrier 30 has a top end 32 and a bottom end 34.

The method comprises lifting the sliding barrier 30 from a lower section of the vessel to an upper section of the vessel 10 thereby placing the inner layer of particles located below a horizontal plane passing through the bottom end 34 of the sliding barrier 30 in direct contact along an interfacial zone with the outer layer of particles located below the horizontal plane passing through the bottom end 34 of the sliding barrier 30. The lower section of the vessel may be in the lower half of the vessel and the upper section of the vessel may be in the upper half of the vessel. During lifting of the sliding barrier 30, the bottom end 34 of the sliding barrier 30 is maintained at a position ranging from below the upper surface of the inner layer 22 to no more than 20 mm above the upper surface of the inner layer 22 or no more than 10 mm above the upper surface of the inner layer 22 and ranging from below the upper surface of the outer layer 24 to no more than 20 mm above the upper surface of the outer layer or no more than 10 mm above the upper surface of the outer layer during the step of lifting the sliding barrier 30. The bottom end 34 of the sliding barrier 30 may be maintained at any suitable position below the upper surface of the inner layer 22 and below the upper surface of the outer layer 24, for example, from 1500 mm or from 1000 mm or from 500 mm or from 100 mm to just below the upper surface of the inner layer 22 and the upper surface of the outer layer 24.

It is desirable during the loading method to maintain the top end 32 of the sliding barrier 30 above the upper surface of the inner layer 22 during discharging particles for the inner layer 22 and to maintain the sliding barrier 30 above the upper surface of the outer layer 24 during discharging particles for the outer layer 24.

The top end 32 of the sliding barrier 30 may be maintained above the lowermost particle discharge position of the inner particle distributor 40 during discharging the particles for the inner layer 22. The top end 32 of the sliding barrier may be maintained above the lowermost particle discharge position of the outer particle distributor 50 during discharging particles for the outer layer 24.

The inner particle distributor 40 may have an uppermost particle discharge position at an elevation higher than the lowermost particle discharge position. The outer particle distributor 50 may have an uppermost particle discharge position at an elevation higher than the lowermost particle discharge position. The top end of the sliding barrier 30 may be maintained above the uppermost particle discharge position of the inner particle distributor 40 and above the uppermost particle discharge position of the outer particle distributor 50.

The sliding barrier 30 may be lifted to a final elevation in the vessel 10 and the inner particle distributor 40, the outer particle distributor 50, and the sliding barrier 30 left in the vessel after completion of loading the particles into the vessel 10 for convenience. With the sliding barrier 30 at its final elevation, particles may be added to the vessel such that the level of the particles reaches the top end of the sliding barrier and even exceeding the top end of the sliding barrier 130.

Figure 3:
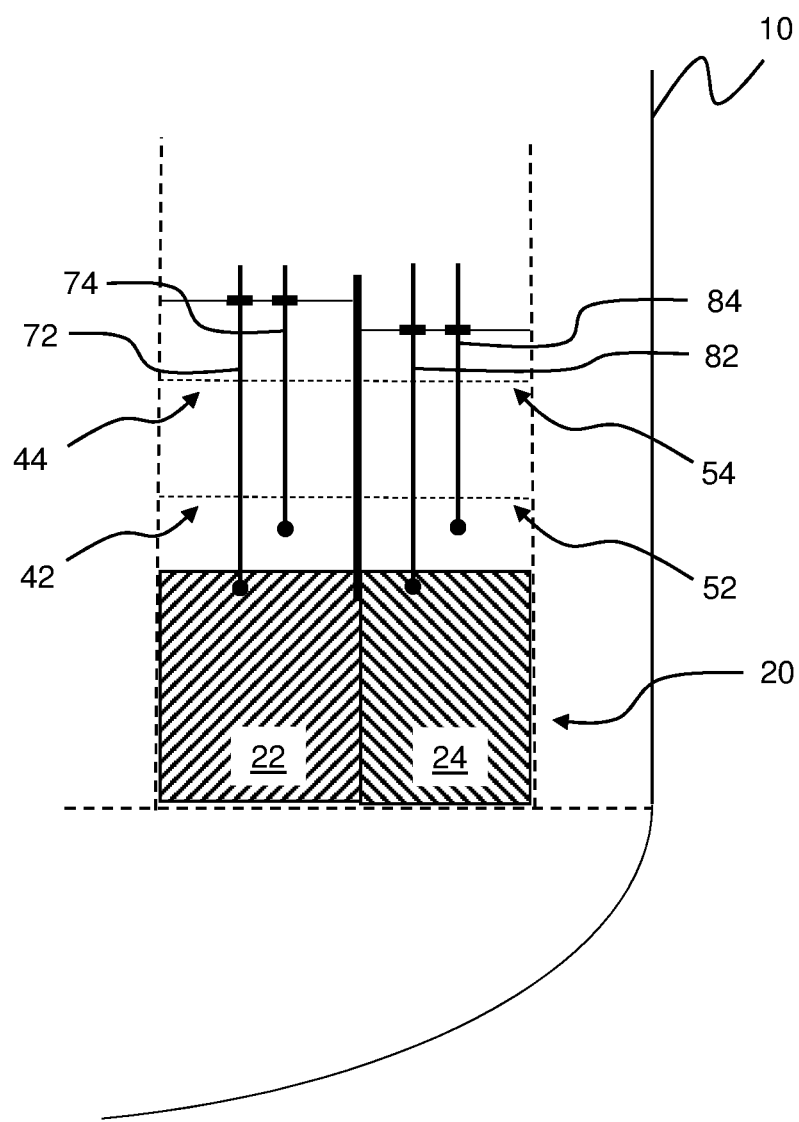
FIG. 3 shows probes for sensing particle levels in the vessel.

With reference to FIG. 3, the lowermost particle discharge position of the inner particle distributor 40 may be maintained from 70 mm to 2500 mm above the upper surface of the inner layer 22 during the step of discharging particles for the inner layer 22, the lowermost particle discharge position of the outer particle distributor 50 may be maintained from 70 mm to 2500 mm above the upper surface of the outer layer 24 during the step of discharging particles for the outer layer 24, and the bottom end 34 of the sliding barrier 30 may be maintained below the upper surface of the inner layer 22 and below the upper surface of the outer layer 24 during the step of lifting the sliding barrier 30 through the use of probes 72, 74, 82, and 84. These probes detect the presence of particles at a particular location. Such probes are commercially available and are, for example, available from the BinMaster division of Garner Industries, Inc., including PROCAP capacitance probes, BMRX or MR rotary probes, and VR or CVR vibrating rod probes.

The method may further comprise sensing whether particles of the inner layer 22 are below a lower limit level for the inner layer 22 using a first probe 72 and generating signals in response thereto, sensing whether particles of the inner layer 22 are above an upper limit level for the inner layer 22 using a second probe 74 and generating signals in response thereto, sensing whether particles of the outer layer 24 are below a lower limit level for the outer layer using a third probe 82 and generating signals in response thereto, sensing whether particles of the outer layer 24 are above an upper limit level for the outer layer using a fourth probe 84 and generating signals in response thereto; and providing particles to the inner particle distributor 40, providing particles to the outer particle distributor 50, and lifting the sliding barrier 30 responsive to the signals from the first probe 72, the second probe 74, the third probe 82, and the fourth probe 84.

The particles may be provided to the inner layer 22 at a rate greater than a rate of providing particles to the outer layer responsive to the first probe 72 for the inner layer generating signals indicating that the particles of the inner layer 22 are below the lower limit level for the inner layer 22 at the same time the third probe 82 is generating signals indicating that the particles of the outer layer 24 are above the lower limit level for the outer layer 24.

The particles may be provided to the outer layer at a rate greater than a rate of providing particles to the inner layer responsive to the first probe 72 generating signals indicating that the particles of the inner layer 22 are above the lower limit level for the inner layer 22 at the same time the third probe 82 is generating signals indicating that the particles of the outer layer 24 are below the lower limit level for the outer layer 24.

The sliding barrier 30 may be lifted responsive to the second probe 74 generating signals indicating that the particles of the inner layer 22 are above the upper limit level for the inner layer 22 at the same time the fourth probe 84 is generating signals indicating that the particles of the outer layer 24 are above the upper limit level for the outer layer 24, the sliding barrier lifted until at least one of (i) the second probe 74 generates signals indicating that the particles of the inner layer 22 are below the upper limit level for the inner layer 22 or (ii) the fourth probe 84 generates signals indicating that the particles of the outer layer 24 are below the upper limit level for the outer layer 24.

Lifting of the sliding barrier 30 may be slowed or halted responsive to the first probe 72 generating signals indicating that the particles of the inner layer 22 are below the lower limit level for the inner layer 22 at the same time the third probe 82 is generating signals indicating that the particles of the outer layer 24 are below the lower limit level for the outer layer 24.

Figure 4:
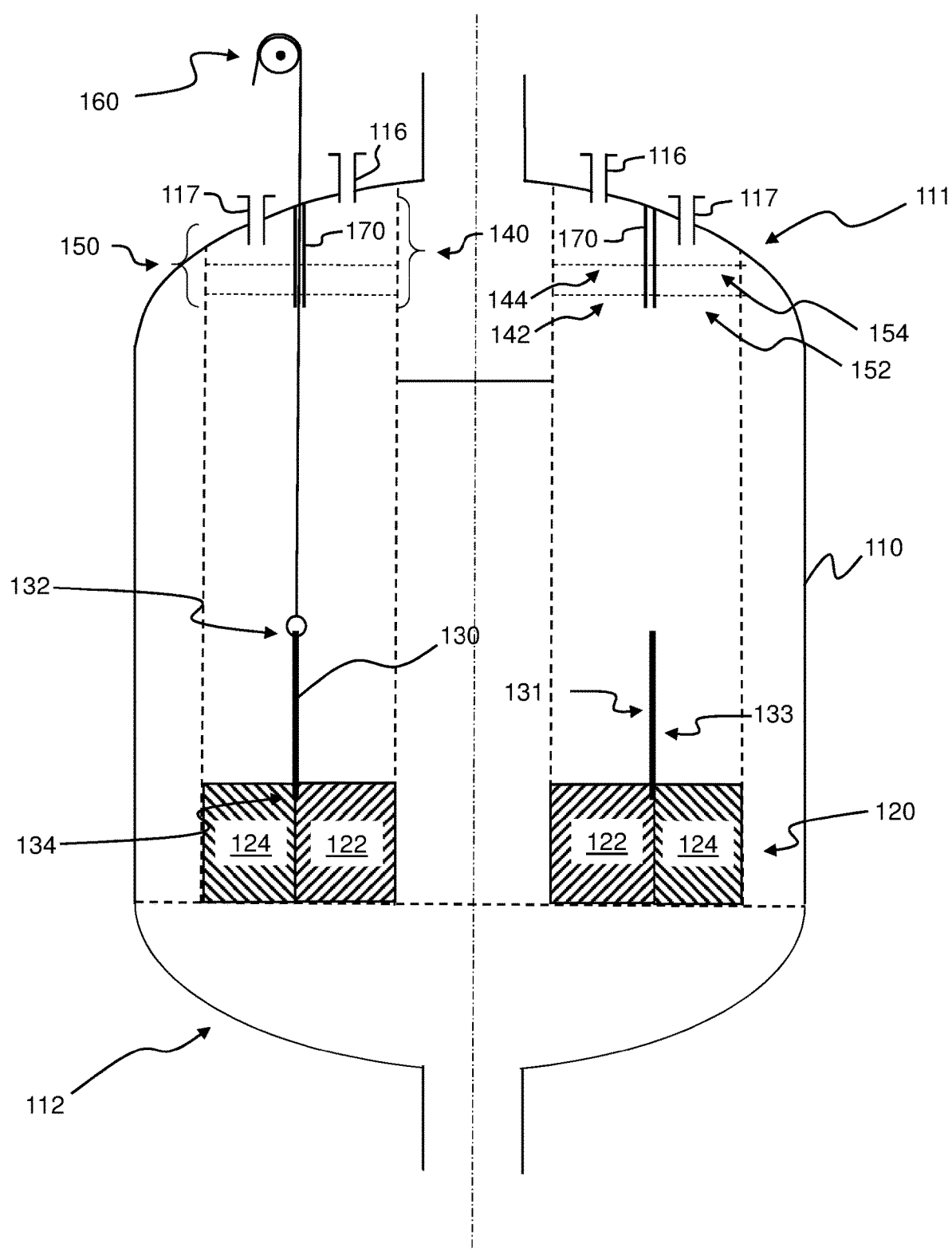
FIG. 4 depicts an axial cross-sectional view of a third embodiment of a particle loading assembly.

FIG. 4 shows an alternative embodiment of a particle loading assembly. The particle loading assembly in the alternative embodiment is for loading particles into a vessel 110 to form a particle bed 120 comprising an inner layer 122 of particles and an outer layer 124 of particles. The inner layer 122 of particles is arranged radially and concentric with the outer layer 124 of particles. The inner layer 122 of particles and the outer layer 124 of particles are in direct contact along an interfacial zone after loading. The vessel 110 has an upper end 111 and a lower end 112.

The inner layer 122 contains at least a first type of particle of different granulometry or range of composition or both granulometry and range of composition from a second type of particle contained in the outer layer 124.

The innermost surface and the outermost surface of the radial flow bed may be supported by cylindrical partitions as is known in the art. The cylindrical partitions may be perforated metal plates or other suitable structure known in the art.

The particle loading assembly of the alternative embodiment shown in FIG. 4 comprises a sliding barrier 130 (i.e. a slip form) for segregating particles for the inner layer 122 from the particles for the outer layer 124 during loading. The sliding barrier 130 segregates the particles during loading and is lifted during loading of the particles leaving the particles forming each layer in direct contact along an interfacial zone. The sliding barrier 130 has a top end 132 and a bottom end 134. The sliding barrier 130 has an inner layer side 131 and an outer layer side 133. The sliding barrier may be made from metal. The thickness of the sliding barrier may range from 1 mm to 20 mm, where the thickness is chosen in order to support the weight of the adsorbent material on the inner and outer surface of the sliding barrier 130.

The particle loading assembly of the alternative embodiment shown in FIG. 4 comprises an inner particle distributor 140 for distributing particles for the inner layer 122. The inner particle distributor 140 is in fixed spaced relation to the upper end 111 of the vessel 110.

The inner particle distributor 140 may have any of the features as described for the inner particle distributor 40 above, taking into account the difference that the inner particle distributor 140 is in fixed space relation to the upper end 111 of the vessel 110, while the inner particle distributor 40 is in fixed spaced relation to the sliding barrier 30.

The means for dispersing particles 142 in FIG. 4 corresponds to the means for dispersing particles 42 in FIG. 1. The spreader 144 in FIG. 4 corresponds to the spreader 44 in FIG. 1. A fixed pipe 116 in FIG. 4 replaces the telescopic pipe 16 in the embodiment in FIG. 1.

The inner particle distributor 140 of the alternative embodiment may comprise one or more particle loading arms (not shown).

The particle loading assembly of the alternative embodiment shown in FIG. 4 comprises an outer particle distributor 150 for distributing particles for the outer layer 124. The outer particle distributor 150 is in fixed spaced relation to the upper end 111 of the vessel 110.

The outer particle distributor 150 may have any of the features as described for the outer particle distributor 50 above, taking into account the difference that the outer particle distributor 150 is in fixed space relation to the upper end 111 of the vessel 110, while the outer particle distributor 50 is in fixed spaced relation to the sliding barrier 30.

The means for dispersing particles 152 in FIG. 4 corresponds to the means for dispersing particles 52 in FIG. 1. The spreader 154 in FIG. 4 corresponds to the spreader 54 in FIG. 1. A fixed pipe 117 in FIG. 4 replaces the telescopic pipe 17 in the embodiment in FIG. 1.

The outer particle distributor 150 of the alternative embodiment may comprise one or more particle loading arms (not shown).

The particle loading assembly of the alternative embodiment shown in FIG. 4 comprises a hoist 160 for lifting the sliding barrier 130 during loading of the particles for the inner and outer layers. The hoist 160 can be any device capable of lifting the sliding barrier 130.

The particle loading assembly of the alternative embodiment shown in FIG. 4 comprises a dividing curtain 170 in fixed spaced relation to the upper end 111 of the vessel 110 operatively disposed to direct particles discharged from the inner particle distributor 140 to the inner layer side of the sliding barrier 130 and to direct the particles discharged from the outer particle distributor 150 to the outer layer side of the sliding barrier 130.

The dividing curtain 170 may be any suitable structure. The dividing curtain may be a solid metal plate, a perforated metal plate, a metal screen, or other similar structure.

The present disclosure also relates to an alternative method using the alternative embodiment shown in FIG. 4 for loading particles into a vessel 110 to form a particle bed 120 comprising an inner layer 122 of particles and an outer layer 124 of particles arranged radially and concentric. The vessel 110 has an upper end 111 and a lower end 112. The inner layer 122 contains at least a first type of particle of different granulometry or range of composition or both granulometry and range of composition from a second type of particle contained in the outer layer 124. The inner layer 122 of particles and the outer layer 124 of particles are in direct contact along an interfacial zone upon completing the alternative method for loading particles.

The method comprises discharging particles for the inner layer 122 from an inner particle distributor 140 onto an upper surface of the inner layer 122 to form the inner layer 122 of particles of increasing height as the particles are discharged. The inner particle distributor 140 is in fixed spaced relation to the upper end 111 of the vessel 110.

The method comprises discharging particles for the outer layer 124 from an outer particle distributor 150 onto an upper surface of the outer layer 124 to form the outer layer 124 of particles of increasing height as the particles are discharged. The outer particle distributor 150 is in fixed spaced relation to the upper end 111 of the vessel 110.

Discharging particles for the inner layer 122 may be simultaneous with discharging particles for the outer layer 124. Alternatively, a stepwise process may be employed where particles for the inner and outer are discharged alternately.

The alternative method for loading particles comprises segregating the particles for the inner layer 122 from the particles for the outer layer 124 with a sliding barrier 130 while the particles for the inner layer and the particles for the outer layer 124 are being discharged. The sliding barrier 130 has a top end 132 and a bottom end 134.

The alternative method comprises lifting the sliding barrier 130 from a lower section of the vessel to an upper section of the vessel 110 thereby placing the inner layer of particles located below a horizontal plane passing through the bottom end 134 of the sliding barrier 130 in direct contact along an interfacial zone with the outer layer of particles located below the horizontal plane passing through the bottom end 134 of the sliding barrier 130. The lower section of the vessel may be in the lower half of the vessel and the upper section of the vessel may be in the upper half of the vessel. During lifting of the sliding barrier 130, the bottom end 134 of the sliding barrier 130 is maintained at a position ranging from below the upper surface of the inner layer 122 to no more than 20 mm above the upper surface of the inner layer 122 or no more than 10 mm above the upper surface of the inner layer 122 and ranging from below the upper surface of the outer layer 124 to no more than 20 mm above the upper surface of the outer layer or no more than 10 mm above the upper surface of the outer layer during the step of lifting the sliding barrier 130. The bottom end 134 of the sliding barrier 130 may be maintained at any suitable position below the upper surface of the inner layer 122 and below the upper surface of the outer layer 124, for example, from 1500 mm or from 1000 mm or from 500 mm or from 100 mm to just below the upper surface of the inner layer 122 and the upper surface of the outer layer 124.

It is desirable during the alternative loading method to maintain the top end 132 of the sliding barrier 130 above the upper surface of the inner layer 122 during discharging particles for the inner layer 122 and to maintain the sliding barrier 130 above the upper surface of the outer layer 124 during discharging particles for the outer layer 124.

The sliding barrier 130 may be lifted to a final elevation in the vessel 110 and the inner particle distributor 140, the outer particle distributor 150, and the sliding barrier 130 left in the vessel after completion of loading the particles into the vessel 110 for convenience. With the sliding barrier 130 at its final elevation, particles may be added to the vessel such that the level of the particles reaches the top end of the sliding barrier and even exceeding the top end of the sliding barrier 130.

The method is otherwise analogous to the method for loading particles described above taking into account that the inner particle distributor 140 and the outer particle distributor 150 are in fixed spaced relation to the upper end 111 of the vessel 110.

Probes as described for FIG. 3 for the loading method above, may be used to control the height of the sliding barrier 130 relative to the height of the inner layer of particles 122 and the outer layer of particles 124 in the alternative loading method as well.

EXAMPLE

A cylindrical receiver of 461 mm diameter was constructed to collect falling adsorbent particles. The receiver was graduated to measure volume of the collected adsorbent particles. Above this receiver, perforated plates and screens were placed to control the flow and distribute the adsorbent particles into the receiver. Alumina particles of 7×12 US mesh were used to test the packing efficiency of the system. A spreader with 5 holes of 12.7 mm diameter each were made in the perforated plate to control of flow of particles into the system. The 12.7 mm holes were located at a radius of 127 mm; the linear distance between each of the holes was about 140 mm; the open area was about 0.44%. For dense packing results, the flow of particles through the spreader was 3.8 liters per minute. The distribution of about 35 liters of adsorbent was complete in about 9 minutes. A spreader constructed of 154×6.4 mm diameter holes provided no particle flow. A spreader constructed of 12×9.5 mm diameter holes provided flow at times, but frequently particle flow through some of the holes stopped. Below the spreader, wire mesh screens or perforated plates were installed as the means for dispersing particles to create a snow fall loading pattern. The particles bounce off the means for dispersing particles screens or plates to spread over the loading area.

Parameters for the tests and results are summarized in Table 1.

Tests 0 and 19 were completed by pouring the particles into the receiver over a 30 second time period to measure the packing density when no dense packing methods were used. The measured density is the base density upon which results from the dense packing tests are compared to determine the "relative" density.

Tests 9 and 15 were completed by allowing the particles to fall through the 12.7 mm holes of the spreader into the receiver. In test 9, the spreader was placed 610 mm above the bottom of the receiver at the start of the test. In test 15, the spreader was placed 1219 mm above the bottom of the receiver at the start of the test. The resulting particle packing density in the tests was the same as that achieved in the dump loading tests 0 and 19. The height above the receiver had no effect on the resulting density.

In tests 10, 12, 13 and 14, a wire mesh screen constructed of 1.2 mm wires with 7.2 mm square openings (7% open area) was placed below the spreader as the means for dispersing particles in snow fall pattern. The distance between the spreader and the means for dispersing particles, the number of means for dispersing particles screens below the spreader, and the distance from lowermost means for dispersing particles to bottom of the receiver at the start of the test were varied. All configurations provided 8% higher particle packing density than that measured when no dense loading devices were used.

In tests 11, 16 and 17, a wire screen constructed of 0.8 mm wires with 5.5 mm square openings (76% open area) was placed below the spreader as the means for dispersing particles in a snow fall pattern. The distance between the spreader and the means for dispersing particles was either 50 mm or 160 mm. It was found that 50 mm was a suitable spacing to achieve a dense load. All configurations provided 6 to 8% higher particle packing density than that measured when no dense loading devices were used.

In test 18, a thin perforated plate with 6.4 mm holes (0.81 mm thickness, 79% open area) was placed below the spreader as the means for dispersing particles in snow fall pattern. In this configuration, the particle packing density was 5% higher than that measured when no dense loading devices were used.

During the test, it was observed that after falling through the spreader holes and bouncing off either Mesh A or Mesh B, that at about 70 mm below the spreader, the particle falling pattern from one hole had spread to overlap the particle falling pattern from the next nearest hole. The observation suggests that the vertical height needed to provide a densely packed particle bed is greater than 70 mm.

TABLE 1

| Test # | Upper Means for Dispersing Particles | Lower Means for Dispersing Particles | Maximum Drop Height (mm) | Minimum Drop Height (mm) | Relative Density |
|---|---|---|---|---|---|
| 0 | none | none | dump | dump | 1.01 |
| 19 | none | none | dump | dump | 0.99 |
| 9 | none | none | 610 | 387 | 1.02 |
| 15 | none | none | 1219 | 991 | 0.99 |
| 10 | none | mesh A | 610 | 399 | 1.08 |
| 12 | none | mesh A | 610 | 400 | 1.08 |

TABLE 1-continued

| Test # | Upper Means for Dispersing Particles | Lower Means for Dispersing Particles | Maximum Drop Height (mm) | Minimum Drop Height (mm) | Relative Density |
|---|---|---|---|---|---|
| 13 | mesh A | mesh A | 610 | 399 | 1.08 |
| 14 | mesh A | mesh A | 1219 | 1008 | 1.08 |
| 11 | none | mesh B | 610 | 400 | 1.08 |
| 16 | none | mesh B | 610 | 396 | 1.06 |
| 17 | mesh B | mesh B | 610 | 398 | 1.07 |
| 18 | none | perforated plate | 610 | 395 | 1.05 |

Mesh A corresponds to a mesh with 1.2 mm wire and 7.2 mm square openings.

Mesh B corresponds to a mesh with 0.8 mm wire and 5.5 mm square openings.

The perforated plate of test 18 has 6.4 mm circular holes where the plate is 79% open.

We claim:

1. A particle loading assembly for loading particles into a vessel to form a particle bed comprising an inner layer of particles and an outer layer of particles, the inner layer of particles arranged radially and concentric with the outer layer of particles, the inner layer containing at least a first type of particle of different granulometry or range of composition or both granulometry and range of composition from a second type of particle contained in the outer layer, the assembly comprising:

a sliding barrier for segregating particles for the inner layer from the particles for the outer layer during loading, the sliding barrier having a top end and a bottom end;

an inner particle distributor for distributing particles for the inner layer, the inner particle distributor in fixed spaced relation to the sliding barrier, the inner particle distributor having a lowermost particle discharge position, wherein a horizontal plane passing through the lowermost particle discharge position of the inner particle distributor passes through the sliding barrier at a position between the top end and the bottom end of the sliding barrier;

an outer particle distributor for distributing particles for the outer layer, the outer particle distributor in fixed spaced relation to the sliding barrier, the outer particle distributor having a lowermost particle discharge position, wherein a horizontal plane passing through the lowermost particle discharge position of the outer particle distributor passes through the sliding barrier at a position between the top end and the bottom end of the sliding barrier; and a hoist for lifting the sliding barrier, the inner particle distributor, and the outer particle distributor during loading of the particles for the inner and outer layers;

wherein a first vertical height, $h_1$, is defined between the lowermost particle discharge position of the inner particle distributor and the bottom end of the sliding barrier, wherein the first vertical height, $h_1$, is at least 100 mm; and wherein a second vertical height, $h_2$, is defined between the lowermost particle discharge position of the outer particle distributor and the bottom end of the sliding barrier, wherein the second vertical height, $h_2$, is at least 100 mm.

2. The particle loading assembly according to claim 1, wherein the inner particle distributor comprises a means for dispersing particles, wherein the means for dispersing particles comprises at least one of a perforated plate, a wire mesh, an expanded metal, or a plate defining a plurality of orifices with an accompanying particle dispersal assembly associated with each orifice of the plurality of orifices.

3. The particle loading assembly according to claim 2, wherein the means for dispersing particles comprises the plate defining the plurality of orifices with the accompanying particle dispersal assembly associated with each orifice of the plurality of orifices, wherein each particle dispersal assembly is disposed adjacent to a respective orifice of the plurality of orifices in the plate, wherein each particle dispersal assembly comprises a deflecting surface disposed relative to its respective orifice such that particles can flow vertically from the respective orifice and be dispersed by the deflecting surface.

4. The particle loading assembly according to claim 2, wherein the inner particle distributor comprises a spreader, wherein the spreader comprises at least one of a perforated plate, a wire mesh, an expanded metal, a particle loading arm, or a plate defining a plurality of orifices with the accompanying particle dispersal assembly associated with each orifice of the plurality of orifices, wherein the spreader of the inner particle distributor is positioned at an elevation above the means for dispersing particles of the inner particle distributor.

5. The particle loading assembly according to claim 4 wherein the spreader of the inner particle distributor comprises the particle loading arm, wherein the particle loading arm comprises a conduit section having a first end and a second end, wherein the first end is in particle flow communication with a supply of particles for the inner layer of particles, and wherein the conduit section has a plurality of orifices disposed between the first end and the second end; and a plurality of particle dispersal assemblies, each particle dispersal assembly being disposed adjacent to a respective orifice in the conduit section, wherein each particle dispersal assembly comprises a deflecting surface disposed relative to its respective orifice such that particles can flow vertically from the respective orifice and be dispersed by the deflecting surface.

6. The particle loading assembly according to claim 1, wherein the inner particle distributor comprises a particle loading arm, wherein the particle loading arm comprises a conduit section having a first end and a second end, wherein the first end is in particle flow communication with a supply of particles for the inner layer of particles, and wherein the conduit section has a plurality of orifices disposed between the first end and the second end; and a plurality of particle dispersal assemblies, each particle dispersal assembly being disposed adjacent to a respective orifice in the conduit section, wherein each particle dispersal assembly comprises a deflecting surface disposed relative to its respective orifice such that particles can flow vertically from the respective orifice and be dispersed by the deflecting surface.

7. The particle loading assembly according to claim 6, wherein each particle dispersal assembly of the particle loading arm of the inner particle distributor further comprises a dispersing surface disposed adjacent to the orifice, wherein a plane tangent to any point on the deflecting surface and a plane tangent to any point on the dispersing surface intersect at an included angle of between about 30 and about 60 degrees, whereby particles can be deflected by the deflecting surface, impinge upon the dispersing surface, and be further dispersed by the dispersing surface.

8. The particle loading assembly according to claim 1, wherein the outer particle distributor comprises a means for dispersing particles, wherein the means for dispersing particles of the outer particle distributor comprises at least one of a perforated plate, a wire mesh, an expanded metal, or a plate defining a plurality of orifices with an accompanying particle dispersal assembly associated with each orifice of the plurality of orifices.

9. The particle loading assembly according to claim 8, wherein the means for dispersing particles of the outer particle distributor comprises the plate defining the plurality of orifices with the accompanying particle dispersal assembly associated with each orifice of the plurality of orifices, wherein each particle dispersal assembly is disposed adjacent to a respective orifice of the plurality of orifices in the plate, wherein each particle dispersal assembly comprises a deflecting surface disposed relative to its respective orifice such that particles can flow vertically from the respective orifice and be dispersed by the deflecting surface.

10. The particle loading assembly according to claim 9, wherein each particle dispersal assembly of the accompanying particle dispersal assemblies of the means for dispersing particles of the outer particle distributor comprises a dispersing surface disposed adjacent each respective orifice of the plurality of orifices, wherein a plane tangent to any point on the deflecting surface and a plane tangent to any point on the dispersing surface intersect at an included angle of between about 30 and about 60 degrees, whereby particles can be deflected by the deflecting surface, impinge upon the dispersing surface, and be further dispersed by the dispersing surface.

11. The particle loading assembly according to claim 8, wherein the outer particle distributor comprises a spreader, wherein the spreader of the outer particle distributor comprises at least one of a perforated plate, a wire mesh, an expanded metal, a particle loading arm, or a plate defining a plurality of orifices with the accompanying particle dispersal assembly associated with each orifice of the plurality of orifices, wherein the spreader of the outer particle distributor is positioned at an elevation above the means for dispersing particles of the outer particle distributor.

12. The particle loading assembly according to claim 11 wherein the spreader of the outer particle distributor comprises the particle loading arm, wherein the particle loading arm of the outer distributor comprises
   a conduit section having a first end and a second end, wherein the first end is in particle flow communication with a supply of particles for the outer layer of particles, and wherein the conduit section has a plurality of orifices disposed between the first end and the second end; and
   a plurality of particle dispersal assemblies, each particle dispersal assembly being disposed adjacent to a respective orifice in the conduit section of the particle loading arm of the outer particle distributor, wherein each particle dispersal assembly comprises a deflecting surface disposed relative to its respective orifice such that particles can flow vertically from the respective orifice and be dispersed by the deflecting surface.

13. The particle loading assembly according to claim 1, wherein the outer particle distributor comprises a particle loading arm (56), wherein the particle loading arm (56) of the outer particle distributor comprises
   a conduit section having a first end and a second end, wherein the first end is in particle flow communication with a supply of particles for the outer layer of particles, and wherein the conduit section has a plurality of orifices disposed between the first end and the second end; and
   a plurality of particle dispersal assemblies, each particle dispersal assembly being disposed adjacent to a respective orifice in the conduit section, wherein each particle dispersal assembly comprises a deflecting surface disposed relative to its respective orifice such that particles can flow vertically from the respective orifice and be dispersed by the deflecting surface.

14. A method for loading particles into a vessel to form a particle bed comprising an inner layer of particles and an outer layer of particles, the inner layer of particles arranged radially and concentric with the outer layer of particles, the inner layer containing at least a first type of particle of different granulometry or composition or both granulometry and composition from a second type of particle contained in the outer layer, the method comprising:
   discharging particles for the inner layer from an inner particle distributor onto an upper surface of the inner layer to form the inner layer of particles of increasing height as the particles are discharged, the inner particle distributor having a lowermost particle discharge position;
   discharging particles for the outer layer from an outer particle distributor onto an upper surface of the outer layer to form the outer layer of particles of increasing height as the particles are discharged, the outer particle distributor having a lowermost particle discharge position;
   segregating the particles for the inner layer from the particles for the outer layer with a sliding barrier while the particles for the inner layer and the particles for the outer layer are discharged, the sliding barrier having a top end and a bottom end; and
   lifting the sliding barrier from a lower section of the vessel to an upper section of the vessel thereby placing the inner layer of particles located below a horizontal plane passing through the bottom end of the sliding barrier in direct contact along an interfacial zone with the outer layer of particles located below the horizontal plane passing through the bottom end of the sliding barrier;
   wherein the lowermost particle discharge position of the inner particle distributor is maintained from 70 mm to 2000 mm above the upper surface of the inner layer during the step of discharging particles for the inner layer;
   wherein the lowermost particle discharge position of the outer particle distributor is maintained from 70 mm to 2000 mm above the upper surface of the outer layer during the step of discharging particles for the outer layer; and
   wherein the bottom end of the sliding barrier is maintained at a position ranging from below the upper surface of the inner layer to no more than 20 mm above the upper surface of the inner layer and ranging from below the upper surface of the outer layer to no more than 20 mm above the upper surface of the outer layer during the step of lifting the sliding barrier.

15. The method according to claim 14 wherein the top end of the sliding barrier is maintained above the upper surface of the inner layer during discharging particles for the inner layer and the sliding barrier is maintained above the upper surface of the outer layer during discharging particles for the outer layer.

16. The method according to claim 14 wherein the top end of the sliding barrier is maintained above the lowermost particle discharge position of the inner particle distributor during discharging particles for the inner layer and the top end of the sliding barrier is maintained above the lowermost particle discharge position of the outer particle distributor during discharging particles for the outer layer.

17. The method according to claim 14 wherein the inner particle distributor has an uppermost particle discharge position at an elevation higher than the lowermost particle discharge position for the inner particle distributor, wherein the outer particle distributor has an uppermost particle discharge position at an elevation higher than the lowermost particle discharge position for the outer particle distributor, wherein the top end of the sliding barrier is maintained above the uppermost particle discharge position of the inner particle distributor and above the uppermost particle discharge position of the outer particle distributor.

18. The method according to claim 14 wherein the sliding barrier is lifted to a final elevation in the vessel and the inner particle distributor, the outer particle distributor, and the sliding barrier are left in the vessel after completion of loading the particles into the vessel.

19. The method according to claim 14 wherein the lowermost particle discharge position of the inner particle distributor is maintained from 70 mm to 2000 mm above the upper surface of the inner layer during the step of discharging particles for the inner layer, the lowermost particle discharge position of the outer particle distributor is maintained from 70 mm to 2000 mm above the upper surface of the outer layer during the step of discharging particles for the outer layer, and the bottom end of the sliding barrier is maintained below the upper surface of the inner layer and below the upper surface of the outer layer during the step of lifting the sliding barrier by sensing whether particles of the inner layer are below a lower limit level for the inner layer using a first probe and generating signals in response thereto;

sensing whether particles of the inner layer are above an upper limit level for the inner layer using a second probe and generating signals in response thereto;

sensing whether particles of the outer layer are below a lower limit level for the outer layer using a third probe and generating signals in response thereto;

sensing whether particles of the outer layer are above an upper limit level for the outer layer using a fourth probe and generating signals in response thereto; and providing particles to the inner particle distributor, providing particles to the outer particle distributor, and lifting the sliding barrier responsive to the signals from the first probe, the second probe, the third probe, and the fourth probe.

20. The method according to claim 19 further comprising at least one of the following steps (a) to (d):

(a) particles are provided to the inner layer at a volumetric rate greater than a volumetric rate of providing particles to the outer layer responsive to the first probe for the inner layer generating signals indicating that the particles of the inner layer are below the lower limit level for the inner layer at the same time the third probe is generating signals indicating that the particles of the outer layer are above the lower limit level for the outer layer, (b) particles are provided to the outer layer at a volumetric rate greater than a volumetric rate of providing particles to the inner layer responsive to the first probe generating signals indicating that the particles of the inner layer are above the lower limit level for the inner layer at the same time the third probe is generating signals indicating that the particles of the outer layer are below the lower limit level for the outer layer, (c) the sliding barrier is lifted responsive to the second probe generating signals indicating that the particles of the inner layer are above the upper limit level for the inner layer at the same time the fourth probe is generating signals indicating that the particles of the outer layer are above the upper limit level for the outer layer, the sliding barrier lifted until at least one of (i) the second probe generates signals indicating that the particles of the inner layer are below the upper limit level for the inner layer or (ii) the fourth probe generates signals indicating that the particles of the outer layer are below the upper limit level for the outer layer, or (d) lifting of the sliding barrier is slowed or halted responsive to the first probe generating signals indicating that the particles of the inner layer are below the lower limit level for the inner layer at the same time the third probe is generating signals indicating that the particles of the outer layer are below the lower limit level for the outer layer.

* * * * *